May 11, 1948.  F. S. RIMER  2,441,290
INSECT SWATTER
Filed Feb. 2, 1944
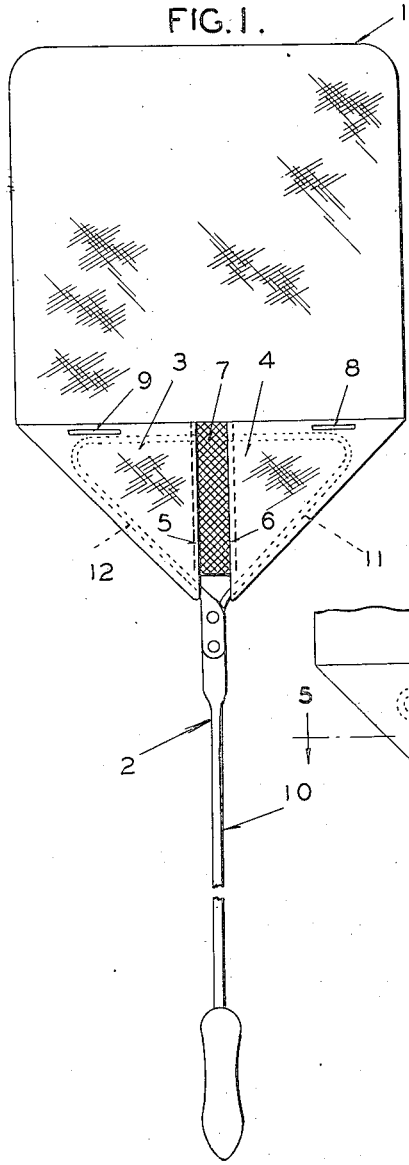
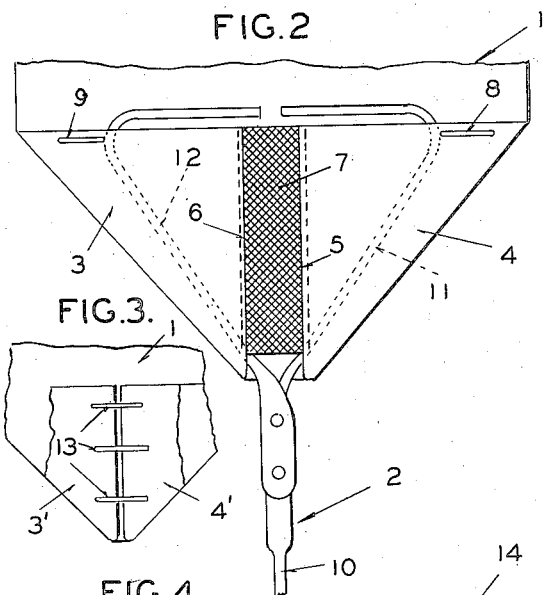
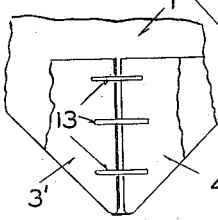
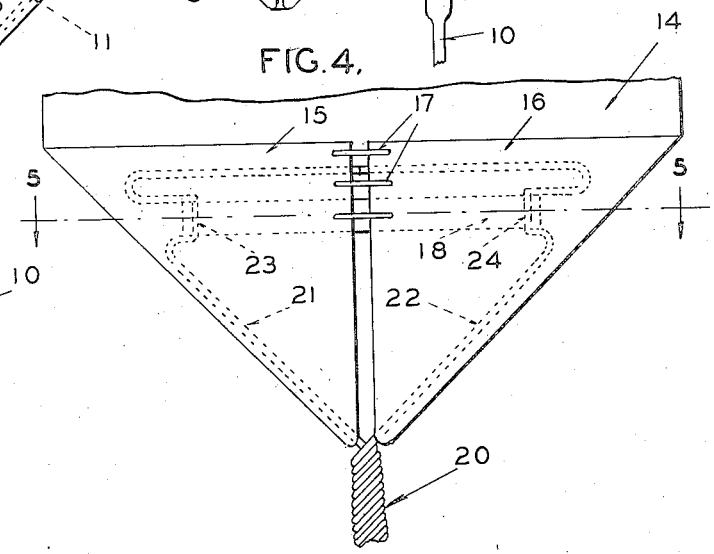
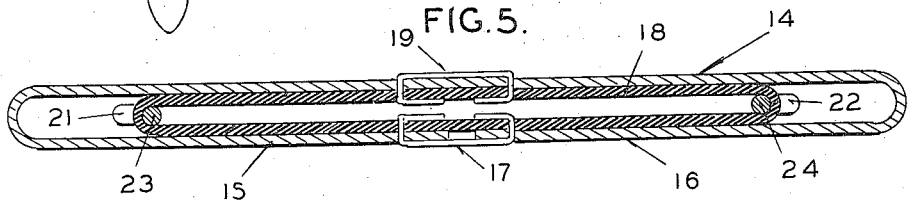
INVENTOR
F. S. RIMER
BY
ATTORNEY Patented May 11, 1948

2,441,290

UNITED STATES PATENT OFFICE 2,441,290

INSECT SWATTER

Foister S. Rimer, Richland, Mo.

Application February 2, 1944, Serial No. 520,727

16 Claims. (Cl. 43—137)

My invention relates to an insect swatter commonly known as a household fly swatter.

One of the objects of my invention is to produce an improved insect swatter which is so constructed that the striking blade may be readily removed when it becomes worn or unsanitary and replaced by a new blade, all without the use of any tools or appliable fastening devices.

Another object of my invention is to so construct an insect swatter handle and blade that the blade will be held attached to the handle by the functioning of resilient means, which resilient means can be conditioned so as to permit the blade to be readily removed and replaced by another blade by the use of the hands only.

Other objects of my invention will become apparent from the following description taken in connection with the accompanying drawings in which Figure 1 is a view of an insect swatter embodying my invention; Fig. 2 is an enlarged view showing the manner in which the blade is attached and removed; Figure 3 is a view showing another manner of securing the flaps together; Figure 4 is a view of a portion of another swatter showing a different construction embodying my invention; and Figure 5 is a sectional view taken on the lines 5—5 and showing certain details.

Referring first to Figures 1 and 2, the insect swatter shown comprises a striking blade 1 and a handle 2. The blade may be constructed in any desired manner from suitable material such as wire, twisted Cellophane or fiber, rubber, and so forth. Preferably the blade is formed from a generally rectangular sheet and two of the corners are folded over to form flaps 3 and 4 having adjacent ends 5 and 6. These adjacent ends are secured together by a connecting sheet 7 preferably of elastic material although it may be of non-stretchable material if desired. The connecting sheet is secured to the marginal portions of the flaps as by sewing, as shown. By connecting the edges 5 and 6 together the flaps, with the body of the blade, form a pocket of general triangular shape having a wide opening at the top and a small opening at the bottom. In order that the pocket opening at the top may be made somewhat narrower and abutment means provided at the opposite sides of the top of the pocket, the upper outer corners of the flap are secured to the body portion of the blade as by staples 8 and 9. By this arrangement it is seen that if a member having a triangular outline substantially the same as the inside of the pocket, is positioned in said pocket, it will be held therein by the abutment means as provided by the staples 8 and 9.

The handle 2 has a shaft portion 10 and upon the upper end of this shaft portion is secured, as by rivets, two fingers 11 and 12 which extend outwardly and then inwardly and together form a triangular end for reception in the pocket formed in the blade. The fingers are resilient and are preferably made of steel. The ends of the fingers are so spaced that the fingers may be sprung inwardly toward each other to decrease the distance between the outer corners of the triangle.

With this triangular end on the shaft portion of the handle and the described pocket arrangement of the blade, it is seen that the blade can be securely attached to the handle yet the blade may be easily and quickly attached or removed. In attaching the blade to the handle, the shaft portion of the handle is pushed through the pocket by inserting it first in the wide top opening and then out through the small bottom opening. This will then bring the fingers partially into the pocket, free insertion being prevented by their engagement with the staples 8 and 9 since the top edge of the triangular end formed by the fingers in their normal condition is of greater length than the distance between staples 8 and 9. If the fingers are now sprung inwardly toward each other, the upper edge length of the triangle will be decreased sufficiently that the fingers can pass the staples and fully enter the pocket. When the fingers now spring back to their normal position, the inwardly extending portions of the fingers will become positioned behind the staples and the blade will be securely held on the handle. In removing the blade the fingers are again sprung inwardly toward each other and then pushed out of the top opening of the pocket. It is thus seen that the attaching and detaching of the blade is a simple and quick operation and no adding or removing of special securing means, such as staples, sewing, and so forth, need be made.

When the connecting sheet 7 is of elastic material the top pocket opening can be somewhat enlarged during the attaching and detaching operation. This facilitates getting the fingers into the pocket as they need not be sprung as much as would be the case if the top opening of the pocket could not be enlarged by stretching. The elastic material also permits the gripping portion of the handle to be more easily pushed through the small opening of the pocket as its stretching will permit this hole to be enlarged under pressure.

When it is not desired or necessary to have the top or bottom openings of the pocket capable of enlargement by stretching, the connecting sheet 7 may be of non-stretchable material such as ordinary cloth or the like. Also, in place of a non-stretchable connecting sheet, the adjacent edges of flaps 3' and 4' may be connected by staples in a manner as shown in Figure 3 wherein staples 13 are employed.

In Figures 4 and 5 there is shown another construction permitting easy attaching and detaching of the blade. In this construction the blade 14 has its lower corners turned over to provide flaps 15 and 16 which have their adjacent marginal portions secured together by staples 17 to form a triangular pocket having a wide opening at the top and a small opening at the bottom. Secured in the pocket is a band 18 made of elastic or resilient material such as stretchable woven cloth, rubber, and so forth. The band is secured at one point to the flaps by means of one of the staples 17 and to the body of the blade at an opposite point by a staple or staples 19.

The handle 20 is shown as made of two twisted wire strands and the attaching end thereof is of a generally triangular shape being made by bending extending ends 21 and 22 of the strands to the desired shape. These ends, in addition to being bent to form the generally triangular attaching end for the handle, are so bent as to provide stirrups 23 and 24 near the upper corners of the triangular end for receiving and holding the band 18.

To attach the blade to the handle, the handle is pushed through the band and pocket to where the triangular attaching end is received in the pocket. The band is now stretched so as to surround the attaching end and with opposed sides resting in the stirrups 23 and 24. Since the band now firmly grips the triangular end of the handle which rests in the pocket and the blade is attached to the band, it is seen that the blade will be firmly attached to the handle. To remove the blade, the band is stretched sufficiently to permit it to be disengaged from the end of the handle which is then pushed out of the pocket and the blade passed over the handle shaft.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In an insect swatter, a handle member, a striking blade member having a pocket, and means on the end of the handle and on the blade for mounting the blade on the end of the handle, said means including resilient means carried by one member and cooperating means on the other member so engageable by the resilient means as to cause it to function to maintain the blade and handle attached, said blade member being capable of removal from the handle member by manually conditioning the resilient means so as to become disengaged from the cooperating means but only while the means on the end of the handle is in the pocket.

2. In an insect swatter, a handle member, a striking blade member having turned over corner portions secured together to provide a pocket having top and bottom openings the former of which is larger, and means on the end of the handle member arranged to be associated with the pocket for mounting the blade member on the handle member by passing the handle through both openings and the means on the end of the handle through the top opening only, said means including resilient means carried by one member and cooperating means on the other member so engageable by the resilient means as to cause it to function to maintain the blade and handle attached, said blade member being capable of removal from the handle member by manually conditioning the resilient means so as to become disengaged from the cooperating means.

3. In an insect swatter, a striking blade having turned over corner portions secured together to provide a triangularly-shaped pocket having two openings of different sizes, a handle provided with a triangularly-shaped blade attaching end for reception in the pocket by passing the handle through both openings and the blade attaching end through the larger opening only, and means for holding said end in the pocket comprising resilient means manually conditionable to permit attaching of the blade to and removal from the handle end without the use of tools or the addition or removal of securing means.

4. In an insect swatter, a handle, a striking blade, and means for mounting the blade on the handle comprising a resilient means carried solely by the blade and cooperating means carried by the handle and arranged to be so engaged by the resilient means as to hold the blade attached, said resilient means being manually conditionable so as to be free of the cooperating means to thereby permit removal of the blade from the handle.

5. In an insect swatter, a striking blade provided with a pocket, a handle, resilient means carried by the blade within the pocket, means on the handle for cooperation with the resilient means to thereby hold the blade on the handle, said resilient means being manually conditionable so as to permit the blade to be attached to or removed from the handle at will without tools or the adding or removing of securing means.

6. In an insect swatter, a handle, means providing resilient fingers on one end of the handle forming a general triangular construction and capable of being displaced toward each other, a striking blade provided with a triangularly-shaped pocket for receiving the fingers, said pocket having inner and outer openings, and abutment means associated with the pocket at the ends of the inner opening, said fingers and pocket being so arranged for cooperation with each other that the fingers will engage behind the abutment means when positioned in the pocket by the passing of the handle through both pocket openings and the displaced fingers through the inner opening only and thus hold the blade firmly secured to the handle yet permitting removal of the fingers from the pocket of the blade by displacing the fingers from a position free of the abutment means.

7. In an insect swatter, a handle provided with resilient fingers on one end of the handle forming a general triangular construction and capable of being displaced toward each other, a striking blade having turned over corners secured together at adjacent edges to provide a triangularly-shaped pocket having a top opening, and means for narrowing the top opening of the pocket and providing closed parts at each side thereof, said fingers being received in the pocket and positioned behind the parts of the pocket on each side of the top opening to thereby hold the blade on the handle but permitting attachment or removal of the blade when displayed sufficiently inwardly toward each other as to pass through the top opening.

8. In an insect swatter, a handle, means providing an irregularly-shaped attaching end on said handle, a striking blade, and a resilient band carried by the blade and engageable with the irregularly-shaped attaching end for firmly securing the blade to the handle.

9. In an insect swatter, a striking blade having turned over corner portions secured together to provide a triangularly-shaped pocket, a handle provided with a triangularly-shaped blade attaching end for reception in the pocket, and means for holding said end in the pocket comprising a band secured to the inside of the pocket and means for holding the band on the attaching end.

10. In an insect swatter, a handle, means providing an irregularly-shaped attaching end on said handle, a striking blade, means forming a pocket in the striking blade, and a resilient band carried by the blade inside the pocket for firmly gripping a portion of the attaching end and securing the blade to the attaching end of the handle when placed in the pocket.

11. In an insect swatter, a striking blade provided with turned over portions secured together to form a pocket, a band secured to the blade within the pocket, a handle, and means on the end of the handle positionable in the pocket and cooperating with the band for holding the blade on the handle, said band and the means on the end of the handle being detachably associated with each other.

12. In an insect swatter, a striking blade having turned over corner portions, elastic means for securing the adjacent edges of the corner portions together to provide a pocket having a variable large opening at the top and a variable small opening at the bottom, a handle having an end part positionable in the pocket by inserting the handle through the pocket from the large to the small opening, and means for holding the end part in the pocket.

13. In an insect swatter, a striking blade having turned over corner portions, elastic means for securing the adjacent edges of the corner portions together to provide a pocket having a variable large opening at the top and a variable small opening at the bottom, a handle having an end part positionable in the pocket by inserting the handle through the pocket from the large to the small opening, and means for holding the end part in the pocket, said last named means embodying resilient means capable of being manually conditioned to permit removal of the blade.

14. An insect swatter blade for ready attachment to and removal from a handle having resilient fingers, said blade comprising a flat member having turned over corner portions, means for securing adjacent edges of the turned over corner portions together to provide a triangular pocket open at the top, and means for securing a portion of the corner portions of the body to the body to reduce the top opening and provide inside shoulder means for engagement by a part of the resilient fingers when caused to be positioned in the pocket.

15. An insect swatter blade for ready attachment to and removal from a handle having an irregular-shaped attaching end, said blade comprising a flat member, means forming a pocket at one end for receiving the attaching end of the handle, and resilient means secured to the inside of the pocket and arranged to receive and grip a portion of the attaching end of the handle when placed in the pocket.

16. An insect swatter blade for ready attachment to and removal from a handle having an irregular-shaped attaching end, said blade comprising a flat member having turned over corner portions, means for securing adjacent edges of the turned over corner portions together to provide a triangular pocket to receive the attaching end of the handle, and a resilient band secured inside the pocket and arranged to receive and grip the attaching end.

FOISTER S. RIMER.

REFERENCES CITED

The following references are of record in the file of this patent:

UNITED STATES PATENTS

| Number | Name | Date |
|---|---|---|
| 1,237,168 | Cash | Aug. 14, 1917 |
| 1,315,186 | Henry | Sept. 2, 1919 |
| 1,407,102 | Viden | Feb. 21, 1922 |
| 2,268,272 | White | Dec. 30, 1941 |
| 2,052,819 | Gollan | Sept. 1, 1936 |